US008747792B2

(12) United States Patent
Kinose et al.

(10) Patent No.: US 8,747,792 B2
(45) Date of Patent: Jun. 10, 2014

(54) METHOD FOR PREPARING HIGH-PURITY ELEMENTAL PHOSPHORUS AND METHOD FOR PREPARING HIGH-PURITY PHOSPHORIC ACID

(75) Inventors: Yutaka Kinose, Tokyo (JP); Toru Hata, Tokyo (JP); Mari Aikawa, Tokyo (JP)

(73) Assignee: Nippon Chemical Industrial Co., Ltd., Tokyo (JP)

( * ) Notice: Subject to any disclaimer, the term of this patent is extended or adjusted under 35 U.S.C. 154(b) by 307 days.

(21) Appl. No.: 13/179,882

(22) Filed: Jul. 11, 2011

(65) Prior Publication Data

US 2012/0009112 A1    Jan. 12, 2012

(30) Foreign Application Priority Data

Jul. 9, 2010    (JP) ................................. 2010-156562

(51) Int. Cl.
*C01B 25/02* (2006.01)
*C01B 25/04* (2006.01)
*C01B 25/20* (2006.01)

(52) U.S. Cl.
USPC ......................................... 423/322; 423/317

(58) Field of Classification Search
CPC .... C01B 25/02; C01B 25/023; C01B 25/027; C01B 25/04; C01B 25/043; C01B 25/047; C01B 25/20; C07C 45/77
USPC ............................. 423/322, 323, 317, 321.1
See application file for complete search history.

(56) References Cited

U.S. PATENT DOCUMENTS

| | | | | |
|---|---|---|---|---|
| 5,670,126 A | * | 9/1997 | Gunkel | .......................... 423/322 |
| 5,989,509 A | | 11/1999 | Gunkel et al. | |
| 6,146,610 A | * | 11/2000 | Gunkel | .......................... 423/322 |

FOREIGN PATENT DOCUMENTS

| | | |
|---|---|---|
| JP | 49-95891 | 9/1974 |
| JP | 06-040710 A | 2/1994 |
| JP | 2002-516809 A | 6/2002 |

OTHER PUBLICATIONS

Gregori et al, "Extractable copper, arsenic and antimony by EDTA solution from agricultural Chilean soils and its transfer to alfalfa plants," Dec. 5, 2003, J. Environ. Monit vol. 6, pp. 38-47.*
Bhat et al, "Antimony (III) and Bismuth (III) EDTA System" 1965, Zeitschrift fur anorganische and allgemeine Chemie. Band 33, pp. 331-336.*

* cited by examiner

*Primary Examiner* — Stanley Silverman
*Assistant Examiner* — Justin Bova
(74) *Attorney, Agent, or Firm* — Westerman, Hattori, Daniels & Adrian, LLP

(57) ABSTRACT

Provided is a method for preparing high-purity elemental phosphorus capable of simultaneously reducing both arsenic and antimony from crude white phosphorus containing a great amount of arsenic and antimony as impurities. Provided is a method for preparing high-purity elemental phosphorus, the method including bringing liquid crude white phosphorus into contact with an iodic acid-containing compound selected from iodic acid and iodates in an aqueous solvent in the presence of a chelating agent, wherein the chelating agent is selected from polyvalent carboxylic acids, polyvalent carboxylates, phosphonic acid and phosphonates.

11 Claims, 1 Drawing Sheet

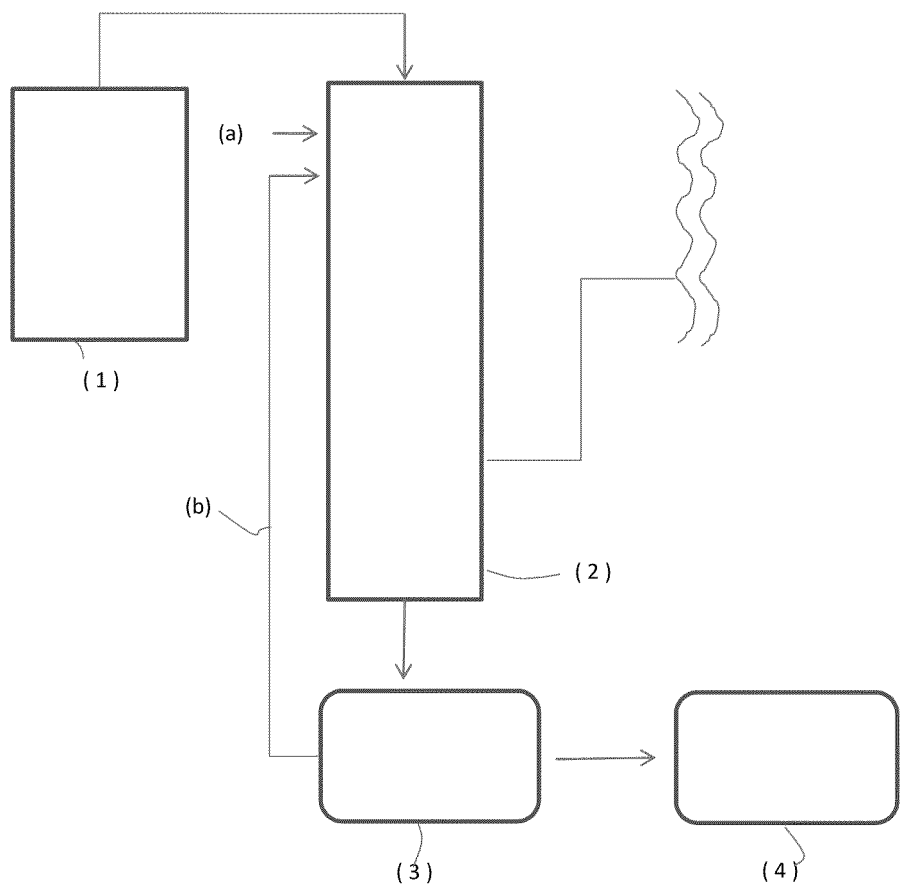

METHOD FOR PREPARING HIGH-PURITY ELEMENTAL PHOSPHORUS AND METHOD FOR PREPARING HIGH-PURITY PHOSPHORIC ACID

BACKGROUND OF THE INVENTION

1. Field of the Invention

The present invention relates to a method for preparing high-purity elemental phosphorus, in particular, one suitable for use as a raw material for high-purity dry phosphoric acid for semiconductor applications and a method for preparing high-purity phosphoric acid using the same.

2. Background Art

White phosphorus contains traces of metal impurities such as Fe, Sb, As and Zn. These metal impurities are derived from phosphate rock, as a raw material of white phosphorus, and are present as impurities in phosphoric acid when the phosphoric acid is prepared from white phosphorus. In recent years, phosphate rock, one white phosphorus raw material, has undergone deterioration in qualities in terms of a resource. Accordingly, the level of impurities, in particular, arsenic or antimony, present in white phosphorus has increased.

Arsenic in crude phosphoric acid is insolubilized as an arsenic sulfide by blowing hydrogen sulfide gas into crude phosphoric acid and can be removed to a level of 30 ppb or less by filtration. However, when the level of arsenic in crude phosphoric acid increases, it takes a long period of time to filter arsenic sulfide, and problems such as deterioration in the filtration rate caused by clogging of arsenic sulfide or a great deterioration in the operation efficiency of a phosphoric acid purification process due to a complicated exchange operation for furnaces occur.

Antimony in crude phosphoric acid is also insolubilized by blowing hydrogen sulfide gas into crude phosphoric acid and is removed by filtration. However, in the case where a great amount of antimony is present in the white phosphorus, it is often difficult to decrease the amount of antimony to 200 ppb or less.

High-purity phosphoric acid is used as an etching agent for SiN films used for silicon wafers for semiconductor applications. In some cases, it is difficult to reduce the amount of impurities present in high-purity phosphoric acid for semiconductor applications and it is thus required to reduce the amount of antimony to 200 ppb or less.

For this reason, it is industrially advantageous that arsenic and antimony are crushed and removed in a state of white phosphorus as a raw material.

Washing with nitric acid is suggested as a method of removing arsenic from crude white phosphorus (for example, see Japanese Patent Application Laid-open No 49-95891). This method has high arsenic removal efficiency, but disadvantageously entails a decrease of white phosphorus yield to about 50% after washing, since phosphorus is released in nitric acid, and production of a great amount of nitric acid waste containing phosphoric acid.

Another removal method is suggested which includes mixing crude white phosphorus with an iodine compound such as iodine oxide or iodic acid, heating the mixture to convert arsenic in the phosphorous into arsenic oxide and heating the mixture to the boiling point or less of arsenic oxide to recover elemental phosphorus (for example, see Japanese Patent Application Laid-open No 06-40710). However, with this method, it is possible to remove only arsenic and is impossible to remove antimony.

In addition, U.S. Pat. No. 5,989,509 discloses a method for purifying white phosphorus by stirring white phosphorus in an aqueous phase containing hydrogen peroxide for one hour or longer to reduce the amount of antimony in the white phosphorus to 200 ppb or less. However, in accordance with study results reported by the inventors of the present invention, removal effects of arsenic are not considered.

Meanwhile, PCT Japanese Translation Patent Publication No 2002-516809 discloses a method of removing both arsenic and antimony by bringing liquid crude white phosphorus into contact with an iodine compound such as iodine, iodic acid or iodate and an oxidizing agent such as hydrogen peroxide in the presence of water. However, technologies associated with simultaneous removal of arsenic and antimony are extremely insufficient and a review of a variety of methods is thus required.

SUMMARY OF THE INVENTION

Accordingly, it is desirable to provide a method for preparing high-purity elemental phosphorus, capable of simultaneously reducing both arsenic and antimony from crude white phosphorus containing a great amount of arsenic and antimony as impurities.

Further, it is a desirable to provide a method for preparing high-purity phosphoric acid containing a considerably small amount of arsenic and antimony using the high-purity elemental phosphorus.

As a result of extensive and intense research to solve the aforementioned problems, the inventors of the present invention discovered that 1) when liquid crude white phosphorus comes in contact with only an iodic acid-containing compound selected from iodic acid and iodates in the presence of an aqueous solvent, arsenic is efficiently removed, but antimony is extracted in an aqueous phase and then incorporated into the liquid white phosphorus again over time, resulting in low antimony removal effects, 2) in this regard, when a chelating agent coexists with the iodic acid-containing compound, the antimony extracted in the water produces a stable chelate compound with the chelating agent, is present in water and is not thus incorporated into the liquid white phosphorus, enabling simultaneous removal of both arsenic and antimony, and 3) high-purity phosphoric acid containing a considerably small amount of arsenic and antimony can be prepared using the high-purity elemental phosphorus. The present invention has been completed based on this discovery.

That is, in accordance with a first aspect of the present invention, provided is a method for preparing high-purity elemental phosphorus including: bringing liquid crude white phosphorus into contact with an iodic acid-containing compound selected from iodic acid and iodates in an aqueous solvent in the presence of a chelating agent.

Also, in accordance with a second aspect of the present invention, provided is a method for preparing high-purity phosphoric acid, including: combusting the high-purity elemental phosphorus obtained according to the first aspect to produce phosphorus pentoxide gas and hydrating the gas.

According to the method for preparing high-purity elemental phosphorus of the invention, it is possible to simultaneously remove both arsenic and antimony from crude white phosphorus containing a great amount of arsenic and antimony as impurities. In addition, it is possible to provide a method for industrially advantageously preparing high-purity phosphoric acid containing an extremely small amount of arsenic and antimony using the high-purity elemental phosphorus as a raw material.

BRIEF DESCRIPTION OF THE DRAWINGS

FIG. 1 is a schematic view illustrating the structure of an apparatus for preparing high-purity phosphoric acid from elemental phosphorus according to one embodiment of the present invention.

| REFERENCE NUMERALS | |
|---|---|
| 1 | flare tower |
| 2 | cooling tower |
| 3 | intermediate bath |
| 4 | phosphoric acid bath |
| a | distilled water |
| b | phosphoric acid |

DETAILED DESCRIPTION OF THE INVENTION

Hereinafter, the present invention will be described based on preferred embodiments.

The term "crude white phosphorus" as used herein refers to crude white phosphorus which contains at least arsenic at 10 ppm or more, preferably 50 to 250 ppm, and antimony at 1 ppm or more, preferably 3 to 20 ppm. The preparation process of crude white phosphorus is not limited, and crude white phosphorus, for example, is obtained by reduction-melting a mixture of phosphate rock, silica stone and carbon material such as coke in an electric furnace for producing phosphorus and collecting gasified white phosphorus, or by heating calcium phosphate, silicates and carbon in an electric furnace and solidifying the formed phosphorus vapor in water and is not limited to those obtained by these methods. Any crude white phosphorus may be used for the present invention so long as it contains arsenic and antimony in amounts as defined above.

The crude white phosphorus is commonly a wax-like transparent lemon yellow solid, which melts and undergoes phase-transition to a liquid, when heated to a melting point (44.1° C.) or higher.

In the preparation method of high-purity elemental phosphorus of the present invention, crude white phosphorus is heated to the melting point or higher and the resulting liquid crude white phosphorus comes into contact with an iodic acid compound selected from iodic acid and iodates in an aqueous solvent in the presence of a chelating agent.

Examples of an iodic acid-containing compound used for the preparation method of the present invention include, in addition to iodic acid, iodates such as sodium iodate, potassium iodate, magnesium iodate, barium iodate, calcium iodate, lithium iodate and ammonium iodate.

In the present preparation method, use of iodic acid and sodium iodate as the iodic acid-containing compound is particularly preferable, from the viewpoint that they are inexpensive and are easy to exhaust water. In addition, the iodic acid-containing compound may be used alone or in a combination thereof of two or more types.

The amount of iodic acid-containing compound added is preferably 0.1 to 5 parts by weight, preferably 1 to 4 parts by weight, based on a conversion of $HIO_3$, with respect to 100 parts by weight of crude white phosphorus, from the viewpoint that arsenic and antimony can be effectively removed from white phosphorus. When the amount of iodic acid-containing compound added is lower than 0.1 parts by weight, based on a conversion of $HIO_3$, removal effects of arsenic and antimony from white phosphorus are reduced. When the amount of iodic acid-containing compound added is higher than 5 parts by weight, based on a conversion of $HIO_3$, iodic acid reacts with white phosphorus, disadvantageously causing a decrease in white phosphorus yield.

Any chelating agent may be used for the preparation method of the present invention without particular limitation so long as it has chelating effects on antimony and arsenic. Examples of preferred chelating agents include polyvalent carboxylic acids, polyvalent carboxylates, phosphonic acid and phosphonates from the viewpoint that they have superior chelating effects on antimony and arsenic.

Examples of polyvalent carboxylic acids and polyvalent carboxylates include amino carboxylic acids such as hydrazine, triethanolamine, glycine, alanine, asparagine, iminodiacetic acid, glutamic acid, ethylenediamine, ethylenediaminetetraacetic acid, or alkali metal salts thereof; and oxycarboxylic acids such as acetic acid, lactic acid, oxalic acid, malonic acid, maleic acid, tartaric acid, citric acid, salicylic acid and thioglycolic acid or alkali metal salts thereof.

Examples of phosphonic acid and phosphonates include nitrilotris(methylenephosphonic acid), hydroxyethane diphosphonic acid, or alkali metal salts thereof.

In the present preparation method, of these chelating agents, ethylenediaminetetraacetic acid and alkali metal salts thereof; citric acid and alkali metal salts thereof; and hydroxyethane diphosphonic acid and alkali metal salts thereof are preferably used from the viewpoint that they exhibit superior synergistic effects with the iodic acid-containing compound and can effectively remove antimony and arsenic. In addition, the chelating agent may be used singly or in a combination of two or more types.

The amount of chelating agent added is 0.1 to 5 parts by weight, preferably 1 to 3 parts by weight, with respect to 100 parts by weight of the crude white phosphorus from the viewpoint that arsenic and antimony can be effectively removed from white phosphorus. When the amount of chelating agent added is lower than 0.1 parts by weight, removal effects of arsenic and antimony are reduced. When the amount of chelating agent added is higher than 5 parts by weight, it is not preferable in terms of increased treatment costs, although removal effects of arsenic and antimony are considered.

In addition, the iodic acid-containing compound and chelating agent are preferably used in a high-purity state in order to prevent incorporation of impurities derived from these reagents.

The aqueous solvent used for the preparation method is not particularly limited and should contain as few impurities as possible. Of these, pure water obtained by allowing water to pass through at least a reverse osmosis membrane, an ultrafiltration membrane, an ion exchange membrane or the like to remove ionic impurities such as Na, K, Ca, Cl and $SO_4$ is particularly preferred in that incorporation of impurities derived from aqueous solvent can be prevented. Examples of water which is passed through a reverse osmosis membrane, an ultrafiltration membrane or an ion exchange resin include water obtained by treating raw water such as industrial water, tap water and river water using an aggregation filter and a pre-treatment apparatus made of activated carbon to remove most suspended and organic substances in raw water, and water obtained by treating raw water with a pure water apparatus using an ion exchange resin.

A commercially available membrane module may be used as a reverse osmosis membrane. In addition, operational conditions to prepare pure water using the module are in accordance with a common method without particular limitation. For example, the reverse osmosis membrane may generally have a fraction molecular weight of 400 to 100,000, preferably, 1000 to 10000, and specific examples of materials for membranes include cellulose acetate-based polymers, polyamide-based polymers, cross-linked polyamine-based polymers, cross-linked polyether-based polymers, polysulfone, sulfonated polysulfone, polyvinyl alcohol and the like. These polymers may be suitably selected. In addition, the membrane may have any of flat, spiral, hollow fiber, tubular and pleat shapes.

A commercially available membrane module may be used as an ultrafiltration membrane. In addition, operational conditions to prepare pure water using the module are in accordance with a common method without particular limitation. For example, the ultrafiltration membrane commonly has a fraction molecular weight of 400 to 100000, preferably 1000 to 10000 and specific examples of suitable materials for membrane include regenerated cellulose, polyether sulfone, polysulfone, polyacrylonitrile, polyvinyl alcohol, sintered metals, ceramics, carbon and the like. In addition, the membrane may have any of flat, spiral, hollow fiber, tubular and pleats shapes.

The amount of aqueous solvent added in the present preparation method is not particularly limited, provided that a crude white phosphorus phase maintains water seal and the volume ratio of the crude white phosphorus phase and an aqueous phase (crude white phosphorus phase/aqueous phase) is 10/90 to 60/40, preferably 20/80 to 50/50. By adding the aqueous solvent within the range defined above, crude white phosphorus can be efficiently brought into contact with the air without oxidation due to the contact. Meanwhile, when the volume ratio of the crude white phosphorus phase and the aqueous phase (crude white phosphorus phase/aqueous phase) is lower than 10/90, the amount of aqueous phase waste increases, thus being industrially disadvantageous. In addition, meanwhile, when the volume ratio of the crude white phosphorus phase and the aqueous phase (crude white phosphorus phase/aqueous phase) is higher than 60/40, the crude white phosphorus phase is further exposed from the aqueous phase, depending on stirring conditions, and thus contact with the air, thus disadvantageously causing a risk of oxidation.

More specifically, a contact operation is carried out by a method such as 1) heating a crude solution containing crude white phosphorus, an aqueous solvent, an iodic acid-containing compound and a chelating agent to a crude white phosphorus liquefaction temperature or higher to form a liquid white phosphorus phase composed of crude white phosphorus and an aqueous phase composed of the iodic acid-containing compound and the chelating agent, and bringing these phases into contact under stirring, 2) heating a crude solution containing crude white phosphorus and an aqueous solvent to a crude white phosphorus liquefaction temperature or higher to form a liquid white phosphorus phase composed of crude white phosphorus and an aqueous phase, adding an iodic acid-containing compound and a chelating agent thereto, and bringing these ingredients into contact under stirring, 3) heating a crude solution containing crude white phosphorus, an aqueous solvent and an iodine-containing compound to a crude white phosphorus liquefaction temperature or higher, to form a liquid white phosphorus phase composed of crude white phosphorus and an aqueous phase containing the iodic acid-containing compound, adding a chelating agent thereto and bringing these ingredients into contact under stirring, 4) heating a crude solution containing crude white phosphorus, an aqueous solvent and a chelating agent to a crude white phosphorus liquefaction temperature or higher to form a liquid white phosphorus phase composed of crude white phosphorus and an aqueous phase containing the chelating agent, adding an iodic acid-containing compound thereto and bringing these ingredients into contact under stirring, 5) heating an aqueous solvent to a crude white phosphorus liquefaction temperature or higher, adding crude white phosphorus, an iodic acid-containing compound and a chelating agent thereto, and bringing these ingredients into contact under stirring, or 6) heating an adjusting solution containing an iodic acid-containing compound, a chelating agent and an aqueous solvent to a crude white phosphorus liquefaction temperature or higher, adding crude white phosphorus thereto, and bringing these ingredients into contact under stirring. In the present invention, the contact method 1) is particularly preferable from the viewpoint that such an operation can be performed under a good operation environment.

In addition, the temperature at which liquid crude white phosphorus comes into contact with the iodic acid-containing compound and the chelating agent is not particularly limited, provided that it allows crude white phosphorus to be present in a liquid state. When contact is generally carried out at a temperature of 50 to 90° C., preferably 50 to 60° C., arsenic and antimony can be more efficiently removed from liquid crude white phosphorus.

The pH of the aqueous phase at which contact treatment is operated is preferably within an acidic or neutral range. It is considered that arsenic contained in the crude white phosphorus phase is extracted as arsenious acid in an aqueous phase by the iodic acid-containing compound, and antimony is extracted as antimonious acid. These arsenious and antimonious acids may be stably present as an aqueous phase in an acidic or neutral range. Meanwhile, it is not preferable that the aqueous phase is alkaline, since arsenious acid and antimonious acid are precipitated as hydrates and are incorporated into the white phosphorus phase again, and at the same time, a small amount of phosphine is disadvantageously produced when white phosphorus is heated in an alkaline range. Accordingly, it is preferred that the contact operation be carried out while maintaining the pH of the aqueous phase at 1 to 7. In addition, in accordance with the method, contact operation may be carried out while controlling the pH via addition of an acid such as phosphoric acid, if necessary.

The contact period of time is not critical in the present preparation method. When the contact operation is performed for generally 0.1 hours or more, particularly, 0.3 to 3 hours, satisfactory high-purity elemental phosphorus can be obtained.

In addition, preferably, a container used for such a contact operation is an airtight container and the atmosphere present therein is replaced with an inert gas, if necessary.

When the contact operation is completed, the white phosphorus phase and the aqueous phase are separated from each other by a common method, to recover the white phosphorus phase high-purity elemental phosphorus in which the amount of arsenic present therein is reduced to 100 ppm or less, preferably 50 ppm or less, particularly preferably, 30 ppm or less, and the amount of antimony present therein is reduced to 200 ppb or less, preferably 100 ppb or less, particularly preferably 20 ppb or less.

The high-purity white phosphorus obtained by the present preparation method may be used as a material for products requiring high purity such as phosphorus trichloride, phosphorus oxychloride or anhydrous phosphoric acid and is particularly suitable for use as a material for high-purity phosphoric acid used for silicon wafer etching for semiconductor applications.

The preparation method of high-purity phosphoric acid according to the present invention includes combusting the high-purity elemental phosphorus obtained above to produce phosphorus pentoxide gas and hydrating the gas.

The preparation of phosphoric acid from elemental phosphorus is depicted by the following reaction scheme:

$$P_4 + 5O_2 \rightarrow P_4O_{10} \quad (1)$$

$$P_4O_{10} + 6H_2O \rightarrow 4H_3PO_4 \quad (2)$$

Hereinafter, with reference to FIG. 1, the method for preparing high-purity phosphoric acid according to the present invention will be described.

High-purity elemental phosphorus and sufficient air to perfectly combust the elemental phosphorus are supplied to a flare tower 1. The combustion temperature is 800 to 2,000° C., preferably 900 to 2,000° C. The phosphorus pentoxide obtained by combusting high-purity elemental phosphorus is discharged from the flare tower 1 together with exhaust gas and is supplied to a cooling tower 2.

In a cooling tower 2 containing water, the exhaust gas comes into contact with water and is thus cooled, and at the same time, phosphorus pentoxide in the exhaust gas is dissolved in water, to obtain phosphoric acid. In practice, it is preferable that the obtained phosphoric acid is cyclically used, instead of water, and make-water is supplied to the cooling tower 2 to adjust the concentration of phosphoric acid, since water is evaporated when contacting hot exhaust gas.

The phosphoric acid thus obtained is accumulated on the bottom of the cooling tower 2, and is thus separated from exhaust gas and collected in an intermediate bath 3. Phosphoric acid collected in the intermediate bath 3 is extracted in an amount corresponding to the amount of phosphorus incorporated in the burning tower 1. The extracted phosphoric acid is filtered, as necessary, and stored in a phosphoric acid bath 4.

The cooling tower 2 is for example a venturi-type cooling tower, a spray-type cooling tower or the like.

As mentioned above, from high-purity elemental phosphorus and the high-purity phosphoric acid, it is possible to obtain high-purity phosphoric acid wherein the content of arsenic is 100 ppm or less, preferably 50 ppm or less, particularly preferably 25 ppm or less, and the content of antimony is 200 ppb or less, preferably 50 ppb or less, particularly preferably 20 ppb or less, wherein the contents of arsenic and antimony are impurity amounts based on a conversion with respect to 85 wt % $H_3PO_4$.

In addition, in another embodiment of the present preparation method, excess hydrogen sulfide gas is blown into the obtained high-purity phosphoric acid, impurity metals contained in the high-purity phosphoric acid are precipitated as a sulfide, phosphoric acid is filtered, and the resulting phosphoric acid comes into contact with air in a removal tower, to remove hydrogen sulfide gas present in phosphoric acid (see Japanese Patent Publication No. 2009-114064). Through a purification process, high-purity phosphoric acid in which the content of arsenic and antimony is further reduced can be obtained.

EXAMPLE

Hereinafter, the present invention will be illustrated with reference to the following Examples and is not limited thereto.

Example 1

180 ml of ion exchange water was added to a 200 ml tall beaker and 0.2 g of EDTA-4Na was further added thereto, followed by dissolution. In addition, 24.2 g of crude white phosphorus and 16 ml of 5 wt % iodic acid were added thereto. The reaction mixture was heated by a heater, and stirred, whereupon crude white phosphorus was liquefied (the number of rotations: about 300 rpm). When the temperature of liquid reached 60° C., stirring was continued at 60° C. for 3 hours (the number of rotations: about 300 rpm). In addition, the pH during contact was 1.8.

At this time, after the temperature reached 60° C., about 1 g of white phosphorus was collected at 15 min, 30 min, 60 min, 120 min and 180 min, to obtain analytical samples. The levels of Sb and As in the samples are shown in Table-1.

In addition, the level of Sb in white phosphorus was assayed as follows. 0.5 to 1.5 g of cooled and solidified white phosphorus was decomposed by oxidation in 50 ml of concentrated nitric acid. After the decomposition, the resulting solution was massed up in a 250 ml measuring flask to obtain an analytical sample solution. The sample solution was suitably diluted and Sb contained therein was assayed by ICP-MS.

In addition, As contained in the analytical sample solution was assayed by ICP-AES.

TABLE 1

| | Stirring time | | | | | |
|---|---|---|---|---|---|---|
| | 0 min (blank) | After 15 min | After 30 min | After 60 min | After 120 min | After 180 min |
| Sb (ppb) | 10000 | 16 | 3 | 10 | 15 | 18 |
| As (ppm) | 192 | 86 | 59 | 58 | 59 | 55 |

Example 2

180 ml of ion exchange water was added to a 200 ml tall beaker and 0.4 g of citric acid was further added thereto, followed by dissolution. In addition, 25.1 g of crude white phosphorus and 16 ml of 5 wt % iodic acid were added thereto. The reaction mixture was heated by a heater, and stirred, whereupon crude white phosphorus was liquefied (the number of rotations: about 300 rpm). When the temperature of the liquid reached 60° C., stirring was continued at 60° C. for 3 hours (the number of rotations: about 300 rpm). In addition, the pH during contact was 2.0.

At this time, after the temperature reached 60° C., about 1 g of white phosphorus was collected at 15 min, 30 min, 60 min, 120 min and 180 min, to obtain analytical samples. The levels of Sb and As in the samples are shown in Table-2.

TABLE 2

| | Stirring time | | | | | |
|---|---|---|---|---|---|---|
| | 0 min (blank) | After 15 min | After 30 min | After 60 min | After 120 min | After 180 min |
| Sb (ppb) | 10000 | 7 | 57 | 68 | 70 | 177 |
| As (ppm) | 192 | 19 | 19 | 19 | 19 | 22 |

Example 3

180 ml of ion exchange water was added to a 200 ml tall beaker, and 0.67 g of a HEDP 60 wt % solution (Deplok, EH-06, manufactured by Nippon Chemical Industrial Co., Ltd.) was further added thereto, followed by dissolution. In addition, 25.3 g of crude white phosphorus and 16 ml of 5 wt % iodic acid were added thereto. The reaction mixture was heated by a heater, and stirred, whereupon crude white phosphorus was liquefied (the number of rotations: about 300 rpm). When the temperature of the liquid reached 60° C., stirring was continued at 60° C. for 3 hours (the number of rotations: about 300 rpm). In addition, the pH during contact was 1.9.

At this time, after the temperature reached 60° C., about 1 g of white phosphorus was collected at 15 min, 30 min, 60 min, 120 min and 180 min, to obtain analytical samples. The levels of Sb and As in the samples are shown in Table-3.

TABLE 3

| | Stirring time | | | | |
|---|---|---|---|---|---|
| | 0 min (blank) | After 15 min | After 30 min | After 60 min | After 120 min | After 180 min |
| Sb (ppb) | 10000 | 20 | 9 | 12 | 25 | 104 |
| As (ppm) | 192 | 19 | 16 | 16 | 16 | 19 |

Comparative Example 1

180 ml of ion exchange water, 22.4 g of crude white phosphorus and 16 ml of 5 wt % iodic acid were sequentially added to a 200 ml tall beaker. The reaction mixture was heated by a heater, and stirred, whereupon crude white phosphorus was liquefied (the number of rotations: about 300 rpm). When the temperature of liquid reached 60° C., stirring was continued at 60° C. for 3 hours (the number of rotations: about 300 rpm). In addition, the pH during contact was 1.8.

At this time, after the temperature reached 60° C., about 1 g of white phosphorus was collected at 15 min, 30 min, 60 min, 120 min and 180 min, to obtain analytical samples. The levels of Sb and As in the samples are shown in Table-4.

TABLE 4

| | Stirring time | | | | |
|---|---|---|---|---|---|
| | 0 min (blank) | After 15 min | After 30 min | After 60 min | After 120 min | After 180 min |
| Sb (ppb) | 12039 | 33 | 323 | 494 | 2476 | 3142 |
| As (ppm) | 194 | 30 | 32 | 32 | 34 | 34 |

In Comparative Example-1, antimony in white phosphorus was efficiently removed in an initial stage, but antimony extracted in an aqueous phase was gradually incorporated into the white phosphorus over time.

Comparative Example-2

180 ml of ion exchange water and 0.2 g of EDTA-4Na were sequentially added to a 200 ml tall beaker and dissolved it. In addition, 25.1 g of crude white phosphorus was added thereto. The reaction mixture was heated by a heater, and stirred, whereupon crude white phosphorus was liquefied (the number of rotations: about 300 rpm). When the temperature of the liquid reached 60° C., stirring was continued at 60° C. for 3 hours (the number of rotations: about 300 rpm). In addition, the pH during contact was 9.6.

At this time, after the temperature reached 60° C., about 1 g of white phosphorus was collected at 15 min, 30 min, 60 min, 120 min and 180 min, to obtain analytical samples. The levels of Sb and As in the samples are shown in Table-5.

TABLE 5

| | Stirring time | | | | |
|---|---|---|---|---|---|
| | 0 min (blank) | After 15 min | After 30 min | After 60 min | After 120 min | After 180 min |
| Sb (ppb) | 8557 | 6020 | 4020 | 3560 | 3236 | 2894 |
| As (ppm) | 194 | 193 | 195 | 194 | 193 | 191 |

<Preparation of High-Purity Phosphoric Acid>

Contact treatment was performed in the same manner as in Example 1, and an aqueous phase and a white phosphorus phase were separated from each other by a common method to recover the white phosphorus phase.

The recovered white phosphorus was combusted in a combustion furnace at 2,000° C. and the produced phosphorus pentoxide gas was hydrated in a cooling tower to obtain high-purity phosphoric acid containing 86 wt % $H_3PO_4$.

The levels of antimony and arsenic in high-purity phosphoric acid were assayed in the same manner as in Example 1. The assay results showed that arsenic was 15 ppm and antimony was 7 ppb.

The present invention provides a method for preparing high-purity elemental phosphorus, capable of simultaneously removing both arsenic and antimony from crude white phosphorus containing a great amount of arsenic and antimony as impurities. In addition, the present invention provides a method for industrially advantageously preparing high-purity phosphoric acid containing an extremely small amount of arsenic and antimony using high-purity elemental phosphorus as a raw material.

What is claimed is:

1. A method for preparing high-purity elemental phosphorus comprising:
   providing a crude white phosphorus including arsenic and antimony as impurities; and an aqueous solution comprising: an iodic acid-containing compound selected from the group consisting of iodic acid and iodates; an aqueous solvent; and a chelating agent, wherein the aqueous solution has a pH of 1 to 2,
   heating the crude white phosphorus at a temperature to provide a liquid state of the crude white phosphorus such that the liquid state of the crude white phosphorus contacts the aqueous solution,
   transferring the impurities from the liquid state of the crude white phosphorus to the aqueous solution;
   removing the aqueous solution to obtain the high-purity elemental phosphorus.

2. The method according to claim 1, wherein the crude white phosphorus contains 10 ppm or more of arsenic and 1 ppm or more of antimony.

3. The method according to claim 1, wherein a treatment of the contact is carried out at a temperature of 50 to 90° C.

4. The method according to claim 1, wherein the chelating agent is selected from the group consisting of polyvalent carboxylic acids, polyvalent carboxylates, phosphonic acid and phosphonates.

5. The method according to claim 1, wherein the chelating agent is selected from the group consisting of ethylenediaminetetraacetic acid, ethylenediaminetetraacetate, citric acid, citrate, hydroxyethylidene diphosphonic acid and hydroxyethylidene diphosphonate.

6. The method according to claim 1, wherein the aqueous solution includes the iodic acid-containing compound at an amount of 0.1 to 5 parts by weight, based on a conversion of $HIO_3$, with respect to 100 parts by weight of crude white phosphorus.

7. The method according to claim 1, wherein the aqueous solution includes the chelating agent at an amount of 0.1 to 5 parts by weight, based on a conversion of $HIO_3$, with respect to 100 parts by weight of crude white phosphorus.

8. A method for preparing high-purity phosphoric acid, comprising:

providing a crude white phosphorus including arsenic and antimony as impurities; and an aqueous solution comprising: an iodic acid-containing compound selected from the group consisting of iodic acid and iodates; an aqueous solvent; and a chelating agent, wherein the aqueous solution has a pH of 1 to 2, heating the crude white phosphorus at a temperature to provide a liquid state of the crude white phosphorus such that the liquid state of the crude white phosphorus contacts the aqueous solution, transferring the impurities from the liquid state of the crude white phosphorus to the aqueous solution;

removing the aqueous solution to obtain the high-purity elemental phosphorus combusting the high-purity elemental phosphorus to produce phosphorus pentoxide gas and hydrating the gas to form high-purity phosphoric acid.

9. A method according to claim 1, wherein after obtaining the high-purity elemental phosphorus, the elemental phosphorus is combusted to produce phosphorus pentoxide gas and hydrating the gas to form high-purity phosphoric acid.

10. The method according to claim 1, wherein the antimony forms a chelating compound included in the aqueous solution.

11. The method according to claim 1, wherein the chelating agent is selected from the group consisting of citric acid, citrate, hydroxyethylidene diphosphonic acid and hydroxyethylidene diphosphonate.

* * * * *